United States Patent [19]

Herrscher

[11] Patent Number: 5,093,461
[45] Date of Patent: Mar. 3, 1992

[54] PROCESS FOR POLYCONDENSING DIPHENOLS WITH DICARBOXYLIC-ACID HALIDES

[75] Inventor: Otto Herrscher, Guntramsdorf, Austria

[73] Assignee: Isonova Technische Innovationen Ges.m.b.H., Austria

[21] Appl. No.: 474,815

[22] PCT Filed: Dec. 7, 1989

[86] PCT No.: PCT/AT89/00119
§ 371 Date: Jul. 17, 1990
§ 102(e) Date: Jul. 17, 1990

[87] PCT Pub. No.: WO90/06335
PCT Pub. Date: Jun. 14, 1990

[30] Foreign Application Priority Data

Dec. 9, 1988 [AT] Austria ............... 3011/88

[51] Int. Cl.$^5$ .............. C08G 65/38; C08G 63/00; C08G 63/02
[52] U.S. Cl. .................. 528/219; 528/176; 528/193; 528/194
[58] Field of Search ............ 528/176, 193, 194, 219

[56] References Cited

U.S. PATENT DOCUMENTS

| | | | |
|---|---|---|---|
| 4,401,803 | 8/1983 | Rieder | 528/176 |
| 4,418,122 | 11/1983 | Rieder et al. | 428/480 |
| 4,430,493 | 2/1984 | Rieder | 428/179 |
| 4,446,195 | 5/1984 | Rieder et al. | 428/458 |
| 4,786,708 | 11/1988 | Serini et al. | 528/176 |

FOREIGN PATENT DOCUMENTS 1479350 3/1967 France .
WO88/03152 5/1988 PCT Int'l Appl. .

Primary Examiner—John Kight, III
Assistant Examiner—T. Mosley
Attorney, Agent, or Firm—Bacon & Thomas

[57] ABSTRACT

In a two-phase interface polycondensation process for preparing aromatic polyesters from diphenols comprising at least in most part a central carbon atom, with groups bound to this carbon atom being hampered in their free rotation, in particular for instance 9,9-bis(4-hydroxyphenyl)fluorene, with dicarboxylic-acid chlorides such as iso-terephthaloyl chloride, the aqueous phase with the diphenolate contains acetone or methylethylketone as the solubilizer, whereas the dicarboxylic-acid chlorides dissolved in a chlorinated hydrocarbon form the organic liquid phase. Compared to known procedures with other solubilizers, for instance isopropanol, in this case polyesters are produced with higher molecular weights. The acetone or methylethylketone also may simultaneously serve as precipitant after the end of polycondensation for the polymer dissolved in the organic liquid phase. The different solvents then employed in the process, for instance water, acetone and the chlorinated hydrocarbon may be separated by rectification and be used again.

7 Claims, No Drawings

PROCESS FOR POLYCONDENSING DIPHENOLS WITH DICARBOXYLIC-ACID HALIDES

TECHNICAL FIELD

The invention concerns a process for polycondensing diphenols at least most of which comprise a central carbon atom, groups bound to this carbon atom being hampered in their free rotation, and halides, especially chlorides, of dicarboxylic acids, using the two-phase interface procedure, in fine dispersion of the aqueous phase, consisting of diphenol, alkali hydroxide to form the diphenolate in stoichiometric relation or in slight excess, further a phase transfer catalyst in a mixture of water and an organic solubilizer, with the organic phase, consisting of a solution of the acid halide in a halogenated hydrocarbon as the solvent, whereupon, on termination of the polycondensation, the polymer is dissolved in this solvent and is precipitated from it by the addition of a precipitating agent.

STATE OF THE ART

A process of the above species is known from the European patent document A1-41495 filed by applicant. According to this European A1 document, monovalent aliphatic alcohols such as isopropanol are used in such polycondensations employing in particular 1,1-bis(4-hydroxyphenyl)-phenylethane or 9,9-bis(4-hydroxyphenyl)fluorene as diphenols. Compared to dioxane, which earlier was frequently used as a solubilizer inert relative to the acid chlorides in two-phase interface polycondensation to prepare aromatic polyesters, this isopropanol offers most of all the advantage of its essentially low toxicity. However it was found that in the manufacture of many polyesters, for instance such as are based on 9,9-bis-(4-hydroxyphenyl)fluorene and iso/tere-phthaloylchloride with use of monovalent aliphatic alcohols such as isopropanol, other conditions being the same, the molecular weights which can be achieved are lower than when dioxane is the solubilizer (see for instance Examples 4 and 5 of said European patent document A1 41496).

EXPOSITION OF THE INVENTION

Hence it is the object of the present invention to provide a polycondensation process of the initially cited kind which uses a solubilizer, for instance isopropanol, which is comparatively non-toxic and whereby higher mean molecular weights of the polyesters to be manufactured can be achieved.

This problem is solved by the process of the invention which is characterized in that at least in the largest part acetone or methylethylketone shall be used as the solubilizer for the diphenol.

Moreover acetone and methylethylketone offer the advantage that under normal conditions they are inert to the acid chlorides, this not being the case for monovalent aliphatic alcohols, as already disclosed in the European patent document A1 41496.

Such a solubilizer evinces the property of being soluble both in the aqueous and in the organic-liquid phases. The solubilizer concentration in the aqueous phase must be adequate to reliably keep the diphenolate dissolved whereas the resultant solubilizer concentration in the organic-liquid phase may not be so high that the polymer forming in it shall precipitate before the end of the polycondensation.

In an advantageous implementation of the invention, the process of the invention is characterized in that at least the largest part of the phenols used assumes the structure

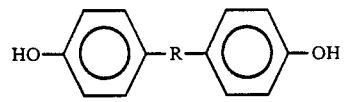

where R is a bifunctional hydrocarbon residue containing at least one aromatic or cycloaliphatic ring.

In a further advantageous implementation of the process of the invention, the diphenol used is 9,9-bis(4-hydroxyphenyl)fluorene.

In yet another advantageous implementation of the process of the invention acetone is used as the diphenol solubilizer and dichloromethane as the solvent.

In yet another advantageous implementation of the process of the invention, an organic liquid used as the diphenol solubilizer is the same liquid which is used to precipitate the polymer.

In a last, advantageous implementation of the invention, the process is characterized in that one or more liquids used in it, namely the water, the solvent, the solubilizer for the diphenol and/or precipitant for the polymer is or are recovered by rectification.

PARTICULAR IMPLEMENTATION OF THE INVENTION

The invention is elucidated below in relation to the example of synthesizing an aromatic polyester based on 9,9-bis(4-hydroxyphenyl)fluorene and isoterephthaloylchloride.

In order to prepare the aqueous phase of the two-phase interface procedure, 3,150 g (9 moles) of 9,9-bis(4-hydroxyphenyl)fluorene with a purity of 99.9% and 1,365 g (20.7 moles) of 85% potassium hydroxide are dissolved in a mixture of 27 liters of de-ionized water and 9 l distilled acetone at room temperature. 207 g (0.9 moles) of benzyltriethylammonium chloride as a phase transfer catalyst are dissolved at room temperature in distilled acetone and this solution is added to the aqueous phase.

In order to prepare the organic liquid phase, 913.65 g (4.5 moles) of isophthaloylchloride and 913.65 g (4.5 moles) of tere-phthaloylchloride are dissolved in 6 l of dichloromethane previously dried by means of a 4A molecular sieve.

First the aqueous phase is introduced into a container with a high-speed agitator and to produce a fine pre-emulsion, 45 l of dichloromethane are added with intensive stirring. A fine emulsion is generated, of which the temperature is adjusted to 17° C. by suitably pre-cooling of the introduced dichloromethane. With further intensive stirring, the organic liquid phase is poured for about 30 s into this pre-emulsion. During the ensuing 10 min, while agitation continues, the viscosity of the emulsion rises strongly. After this time, the polycondensation is essentially terminated, the formed polyester being dissolved in the organic liquid phase.

Thereupon by mere standing, the organic liquid phase separates from the aqueous one. The aqueous phase is decanted, the remaining still highly alkaline organic phase being adjusted by means of diluted hydrochloric acid and with stirring to a pH of 6-7.

Next the organic liquid phase shall be washed three times, each time with 30 l of demineralized water. Thereupon, with continuing stirring, 30 l of acetone are added till the polyester precipitates. The acetone is separated by decanting from the precipitate and 30 l acetone are added to the precipitate consisting essentially of the prepared polyester. Next the precipitate suspension is centrifuged, whereby dichloromethane residues are also removed, and the precipitate thereafter is washed in the centrifuge with 30 l of a 1:1 mixture of acetone and de-ionized water and then with 60 l de-ionized water. The polyester so obtained is next dried at 130° C. within 16 h in a circulating-air drying cabinet.

3,930 g of polyester (91% of theoretical) are obtained, with an inherent viscosity of 3.8 dl/g measured at 30° C. in a 100 ml solution of 0.5 g polyester in a solvent of 60% by weight phenol and 40% by weight 1,1,2,2-tetrachloroethane. The relative molecular weight determined by gel permeation chromatography is 1,133,000 (measured in 1,2-dichloroethane relative to the polystyrene standard).

Large quantities of water, acetone and dichloromethane are used in the described process, and they are present following the end of this process in large part as mixtures of water-acetone and acetone-dichloromethane. All three liquids, namely water, acetone and dichloromethane were found to lend themselves to separation from one another by rectification and in such purities that they can be recycled into the process.

In the above process variation, wherein the acetone serves both as solubilizer for the diphenol and as precipitant for the polyester, only three liquids are involved that require separation by rectification. Separation is simplified, and therefore an additional advantage is being offered.

MARKETABILITY

The polyesters prepared in the manner of the invention illustratively may be used as electrical insulators.

I claim:

1. A process for polycondensing diphenols and halides of dicarboxylic acids using a two-phase, interphase procedure, comprising reacting a fine emulsion of an aqueous phase comprised of a diphenol and alkali hydroxide in the stoichiometric relation or in slight excess to form the diphenolate, a phase transfer catalyst, an organic solubilizer and water, with an organic-liquid phase, comprised of a solution of a dicarboxylic acid halide in a halogenated hydrocarbon solvent, wherein upon termination of the polycondensation the polymer is dissolved in said solvent and precipitating said polymer from said solvent by the addition of a precipitant, wherein acetone or methylethylketone comprise the major portion of the organic solubilizer in said aqueous phase.

2. Process defined in claim 1, wherein the majority of the diphenols have the structure

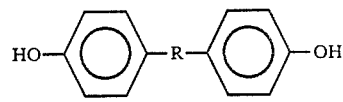

where R is a bifunctional hydrocarbon residue containing at least one aromatic or cycloaliphatic ring.

3. Process defined in claim 2, wherein the diphenol used is 9,9-bis(4-hydroxyphenyl)fluorene.

4. Process defined in claim 1, wherein acetone is the organic solubilizer for the diphenol in said aqueous phase and dichloromethane is the halogenated hydrocarbon solvent in said organic-liquid phase.

5. Process defined in claim 1, wherein an organic liquid is the organic solubilizer for the diphenol in said aqueous phase and is the same liquid as the precipitant for the polymer.

6. Process defined in claim 1, wherein one or more of the liquids used in the process is recovered by rectification.

7. Process defined in claim 6, wherein one or more of said liquids are members selected from the group consisting of water, solvent, solubilizer and precipitant.

* * * * *